(12) United States Patent
Allen et al.

(10) Patent No.: US 9,041,252 B2
(45) Date of Patent: *May 26, 2015

(54) ADVANCED RENEWABLE ENERGY HARVESTING

(75) Inventors: James Allen, San Jose, CA (US); Eugene Krzywinski, San Jose, CA (US); Troy Speers, Corralitos, CA (US)

(73) Assignee: EIQ ENERGY, INC., San Jose, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 13/371,213

(22) Filed: Feb. 10, 2012

(65) Prior Publication Data

US 2012/0139352 A1 Jun. 7, 2012

Related U.S. Application Data

(63) Continuation of application No. 12/338,610, filed on Dec. 18, 2008, now Pat. No. 8,138,631.

(60) Provisional application No. 61/016,365, filed on Dec. 21, 2007.

(51) Int. Cl.
*H02J 1/10* (2006.01)
*H02J 7/35* (2006.01)
*H02J 13/00* (2006.01)
*H02J 1/00* (2006.01)

(52) U.S. Cl.
CPC ... *H02J 1/10* (2013.01); *H02J 7/35* (2013.01); *H02J 13/0075* (2013.01); *Y02E 10/566* (2013.01); *Y02E 10/58* (2013.01); *Y04S 10/123* (2013.01); *Y02E 40/72* (2013.01)

(58) Field of Classification Search
USPC .......................................................... 307/82
See application file for complete search history.

(56) References Cited

U.S. PATENT DOCUMENTS

| | | | |
|---|---|---|---|
| 4,404,472 A | 9/1983 | Steigerwald | |
| 5,627,737 A | 5/1997 | Maekawa et al. | |
| 6,031,736 A | 2/2000 | Takehara et al. | |
| 6,281,485 B1 | 8/2001 | Siri | |
| 6,433,522 B1 | 8/2002 | Siri | |
| 7,158,395 B2 | 1/2007 | Deng | |
| 8,138,631 B2 * | 3/2012 | Allen et al. | 307/82 |
| 2005/0162018 A1 | 7/2005 | Realmuto et al. | |
| 2005/0275386 A1 | 12/2005 | Jepsen et al. | |
| 2008/0144294 A1 | 6/2008 | Adest et al. | |
| 2008/0150366 A1 | 6/2008 | Adest et al. | |
| 2009/0150005 A1 | 6/2009 | Hadar et al. | |
| 2009/0179500 A1 * | 7/2009 | Ragonese et al. | 307/82 |

* cited by examiner

*Primary Examiner* — Robert Deberadinis
(74) *Attorney, Agent, or Firm* — Michael A. Glenn; Perkins Coie LLP

(57) ABSTRACT

The power of DC electrical sources is combined onto a DC buss, such that each source behaves independently from any other source attached to the buss. In one embodiment, a converter module is attached to each of a plurality of solar photovoltaic panels and its output is attached in a parallel manner to a common buss that forms the input to a DC AC inverter. The converter module includes a Maximum Power Point Tracking component that matches the output impedance of the panels to the input impedance of the converter module. The converter also includes a communication component that provides parametric data and identification to a central inverter. Data generated by each converter module is transmitted over the power line or by wireless means and is collected at the inverter and forwarded to a data collection and reporting system.

24 Claims, 6 Drawing Sheets

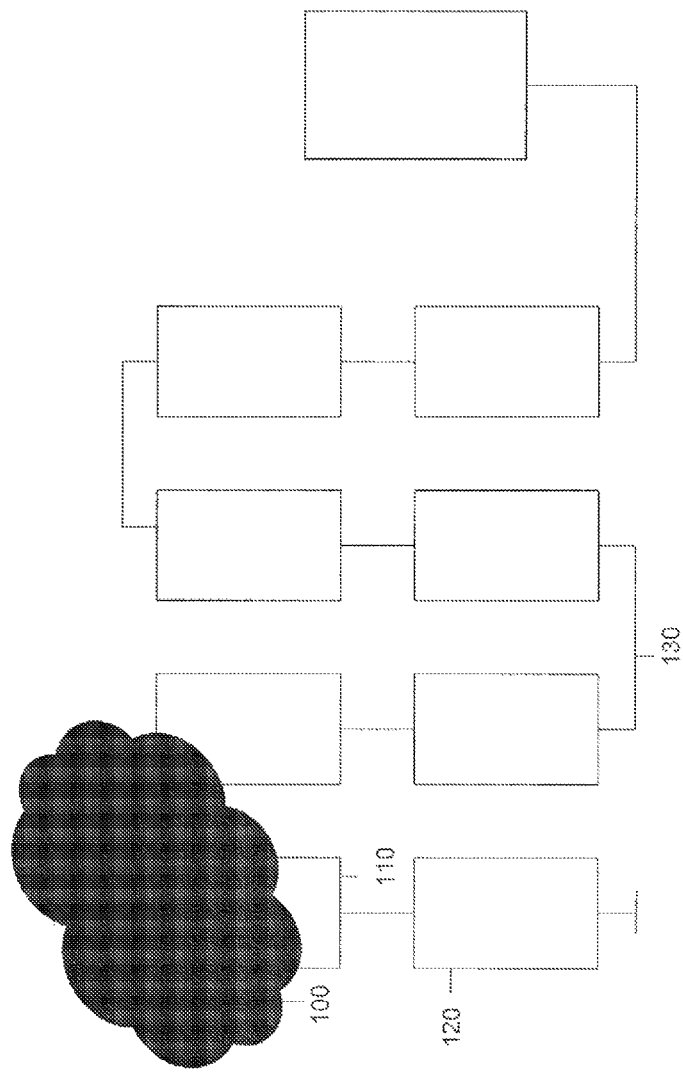

ADVANCED RENEWABLE ENERGY HARVESTING

CROSS REFERENCE TO RELATED APPLICATIONS

This patent application is a continuation of U.S. patent application Ser. No. 12/338,610, filed Dec. 18, 2008, which is currently allowed, and which claims the benefit of U.S. provisional patent application No. 61/016,365, Packaging, Assembly, and Mounting of Photovoltaic Solar Panels, filed Dec. 21, 2007, the entirety of each which are incorporated herein by this reference thereto.

BACKGROUND OF THE INVENTION

1. Technical Field

This invention relates generally to the field of renewable energy power management. More specifically, this invention relates to the power production, power conversion, and power management of DC energy sources systems.

2. Description of the Related Art

Coal-burning energy produces some of the highest greenhouse-gas emissions of any of the fuels in widespread use. The United States currently uses coal-burning fuel to provide about half of the country's electric power. The United States is continually striving to find cheap and efficient ways to generate its own clean energy in an effort to improve the environment and achieve energy independence.

The shift to more energy-efficient policies can also create new jobs. In California, for example, nearly one and a half million jobs have been created between 1977 and 2007 as a result of energy-efficiency policies. The state's policies improved employee compensation by $44.6 billion.

Solar power is one of the cleanest sources of energy available. Sunlight is captured from the sun in the form of electromagnetic radiation and generated into a direct current (DC) using photovoltaic (PV) cells. The PV cells are made of semiconductors, e.g. silicon and are fabricated in the form of semiconductor arrays, films, inks, or other materials. The individual PV cells can be aggregated, interconnected together, and then packaged into solar panels of some size and shape and within a rugged, environmentally sealed enclosure that is suitable for physical mounting and/or installation on residences, businesses, earth-mounted poles, vehicles, rooftops, and other locations.

The DC has a current (I) and voltage (V). The relationship between the currents produced by a solar panel or series-connected group of panels and the output voltage may be plotted or graphed on an XY axis as a family of IV curves. The solar panel output current I bears a direct relationship to the spectral power density or level of sunlight (spectral irradiance) illuminating the panel at a given time, and may change dramatically relative to small changes in irradiance. In the typical case where some number of such solar panels are series connected, the solar panel with the lowest level of current flow will dictate or set the current flowing throughout the series circuit. Panels connected in series can lose up to 60% of their energy as a result of being limited by the worst-performing panel.

FIG. 1 illustrates one type of problem associated with series-connected solar panels that are limited by the solar panel with the lowest level of current flow. On a sunny day, all the panels may receive the same level of sunlight. If there are any clouds 100 in the sky, however, they may partially obscure a panel 110. So even though some of the panels may be receiving almost all sunlight 120, because the system is series connected 130, the current flow is limited by the worst performing panel 110.

The optimal power of the solar panel array is obtained by incorporating a maximum power point tracking (MPPT) algorithm to optimize the overall power available for harvesting to maintain the power output at the maximum level possible for a given system or string current. Usually the electronics and any software necessary to implement this MPPT function are incorporated into the implementation of the system's DC-to-AC conversion function (DC-to-AC inverter) in grid-connected PV systems or as a component of a storage battery charging and control system for off-grid solar applications. Global MPPT algorithms provide only the average operating point of the total string, not the maximum. An optimized system provides per panel MPPT functionality to account for individual panel optimum operating points as well as variations in panel operating characteristics.

String inverters must be able to accommodate strings of varying numbers of interconnected panels and a wide variety of panel types. Because of these variations, a traditional DC-to-AC inverter used in a series-connection system is subjected to high stress and heat levels resulting in a one percent failure rate within the first six months.

Various methods have been implemented to maximize the energy output. In U.S. Pat. No. 7,158,395, for example, an outer voltage feedback loop was developed to track trends in increasing power sources and adjust the MPPT algorithm accordingly. This approach suffers from a limitation on overall or maximum system power that may be harvested at any point in time due to the series connection of panels, and the requirement that the current flowing through such a series circuit cannot be any greater than that produced by the panel with the smallest output current.

U.S. Publication Number 2008/0097655 discusses calculating a separate MPPT for each solar panel to optimize power production. [0026] The panels supply power to the bus separately. [0026] Information about each panel is transmitted on top of the bus to a management unit, which is connected to a network using TCP/IP protocol. [0020]-[0021] The management unit provides monitoring and control for system components. [0020]

The design of series-connected panel systems is time consuming. All panels must be from the same manufacturer and be of the same model or power rating, multiple strings of series-connected panels must be of the same length or contain the same number of panels, panels with different orientation to the sun must be treated as separate subsystems, and add-ons to an existing installation are treated as additions of a completely separate subsystem.

The maintenance of series-connected panel systems is also time-consuming. When a system is connected in series, any defects in one of the panels will cause the entire system to fail. This is the same defect that occurs in a string of Christmas lights when one of the lights breaks. To locate the defective panel, a technician must test the panels separately. As a result, the cost of hiring a technician to visit the site and locate the defective panel is prohibitively expensive.

SUMMARY OF THE INVENTION

In one embodiment, the invention provides a separate DC DC boost converter and maximum power point tracking (MPPT) component for each energy gathering source. In one embodiment, the energy gathering source is a solar panel. The MPPT component matches the output impedance of the panels to the input impedance of the boost converter to maximize the power for each panel. The individual converter component boosts output voltage of the panels to a voltage that is high enough to minimize transmission wire losses while efficiently inverting the DC to an AC voltage.

Using a parallel method of interconnecting a number of solar panels with a constant voltage output to a DC buss eliminates the problems associated with using a string of series-connected solar panels. This system allows the current from each individually optimized panel to sum together to produce a current that is independent of the efficiency or solar conversion capability of any one panel. As a result, the system overcomes the Christmas light problem because the system continues to function even with broken panels.

This creates the freedom to use different solar panels with different IV characteristics, panels constructed from different PV technologies, and panels installed at different orientations relative to the sun. In one embodiment, additional panels are added to the installation at any time. In another embodiment, other power sources, e.g. fuel cells, batteries, wind turbines, etc. are coupled to individual converter components and attached to the DC buss for either point of use or DC to AC conversion for use or sale back to the utility company.

In another embodiment, a communications component is coupled to each panel for monitoring. The monitoring system provides information such as panel ID, temperature, voltage, current, power, efficiency, diagnostics, etc. The monitoring system is for individual users or a company that harvests the energy. This information helps technicians immediately identify malfunctioning panels and maximizes the efficiency of each panel. The monitoring system also provides information regarding the output and efficiency of the complete system and alerts the producer of underperformance or problematic power production.

BRIEF DESCRIPTION OF THE DRAWINGS

FIG. 1 is a block diagram that illustrates a prior-art system of series-connected solar panels;

DETAILED DESCRIPTION OF THE INVENTION

The invention is a system and method for harvesting electrical energy from solar panels and for converting it into energy. Each solar panel is coupled to a converter component, which is connected in parallel to a DC power buss. The converter component includes a DC DC boost converter for boosting the panel's output voltage for DC transmission on a power buss, an MPPT component for maximizing energy transfer between the panel and the transmission buss, and a communication component for receiving information about the panel and transmitting the information to a user and a company that manages the panels. The power buss is connected to an inverter for changing the power from a direct current (DC) to an alternating current (AC) and generating an AC that is in phase with the power grid.

Figure 2A:
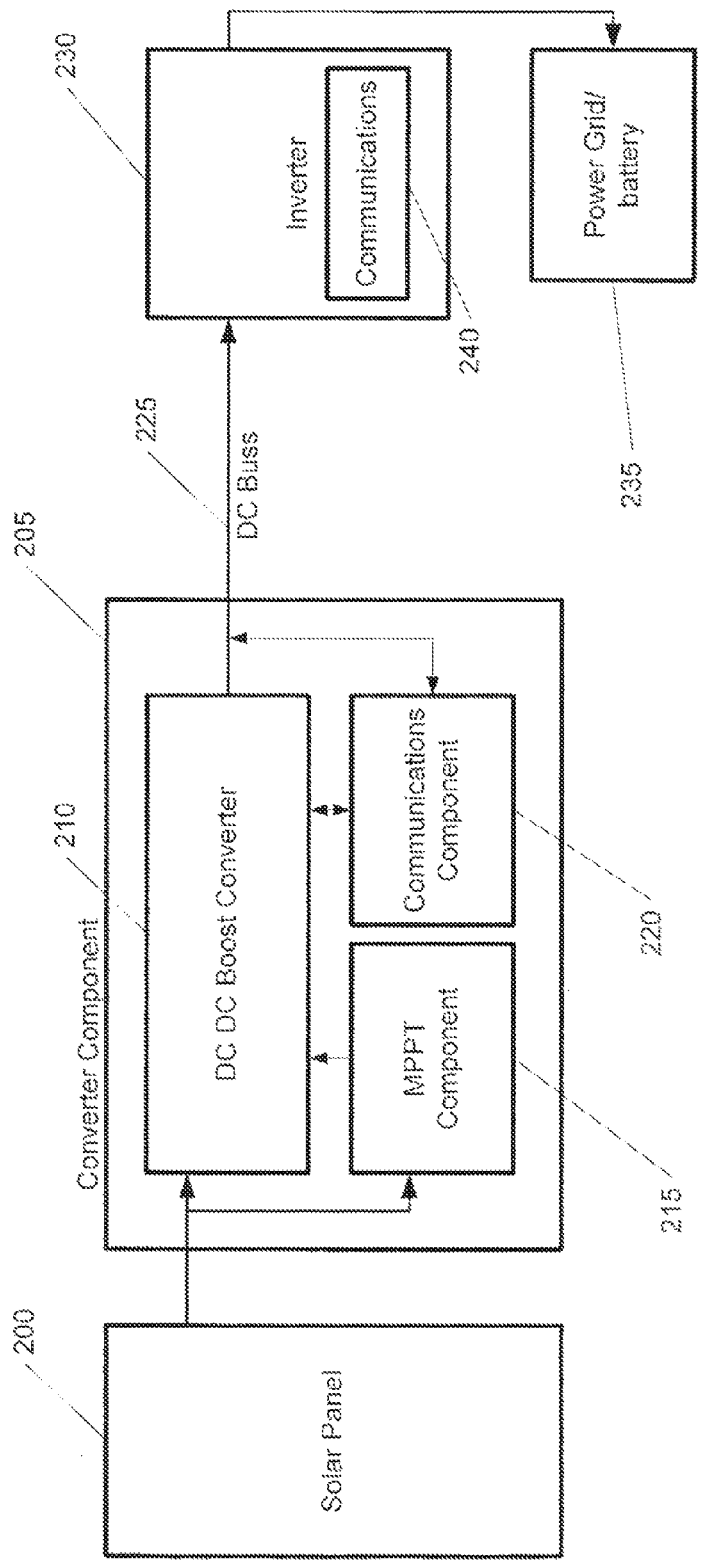
FIG. 2A is an illustration of a solar panel system according to one embodiment of the invention.

One embodiment of the system for each solar panel is illustrated in FIG. 2A. In one embodiment, the power is obtained from solar panels 200. In another embodiment, the power is obtained from another energy source, e.g. wind, hydroelectric, fuel cell, battery, etc. or a combination of these sources. Persons of ordinary skill in the art will understand that although the system is discussed with reference to solar panels, the system architecture is easily applied to other energy sources.

Each solar panel 200 is coupled to an individual converter component 205. The converter component 205 receives the electrical power output from the solar panel 200. The converter component 205 comprises a DC DC boost converter 210, a MPPT component 215, and communication component 220. The MPPT component 215 determines the maximum power point using a MPPT algorithm. The boost converter 210 converts the electrical power output to a higher voltage and lower current for transmission via a DC power buss 225 to the inverter 230. The communication component 220 collects information about the solar panel 200, e.g. panel identification, voltage, current, power, temperature, diagnostics, etc.

The inverter 230 converts the electrical power from DC to AC to be transferred to the power grid 235 or a battery 235 for storage. Information about the solar panel 200 and converter module 205 collected by the communications component 220, e.g. panel ID, temperature, voltage, current, power, efficiency, diagnostics, etc. are transmitted to a corresponding communication component 240 that forms part of the inverter 230. These components are discussed in more detail below.

Figure 2B:
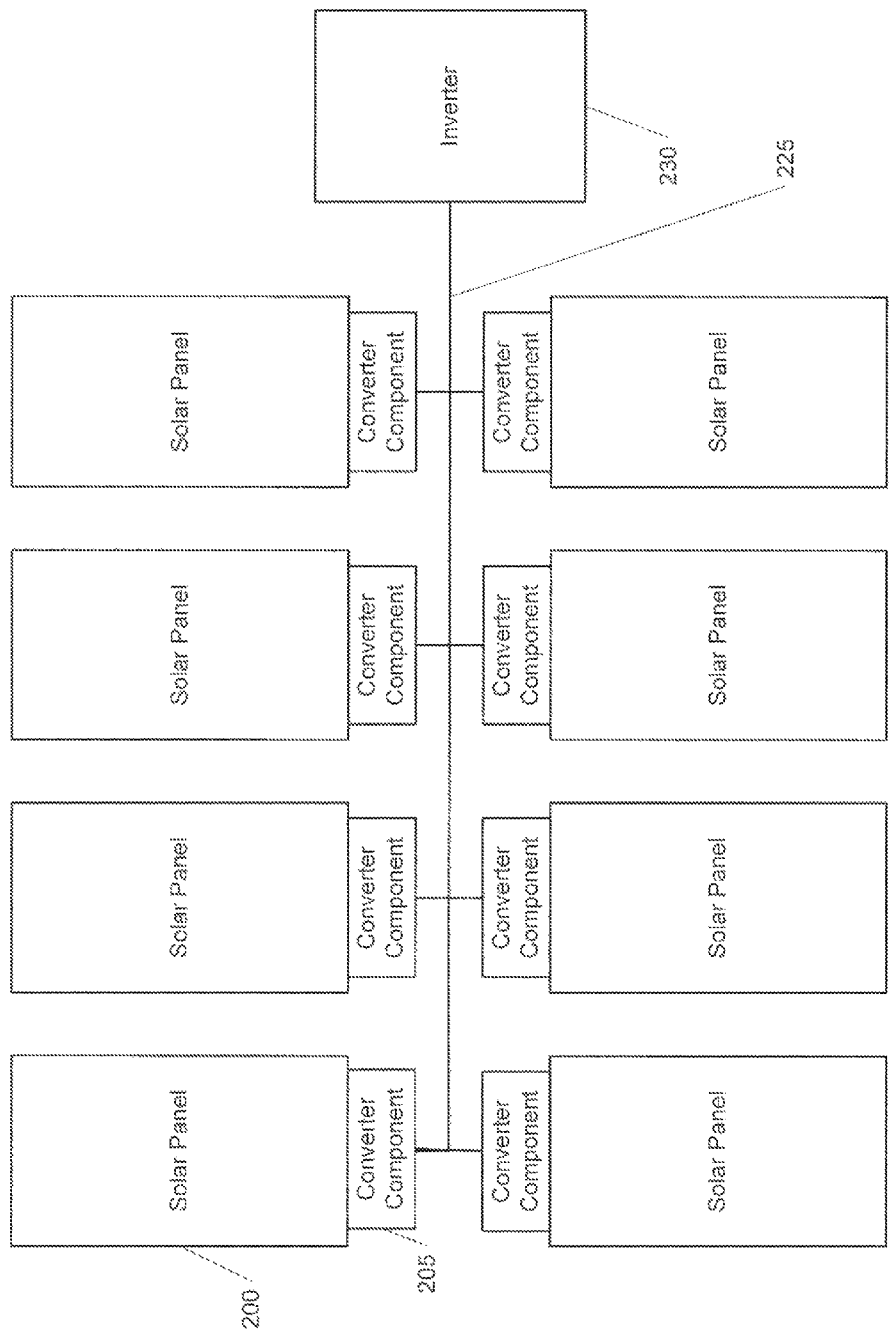
FIG. 2B is an illustration of a solar panel system connected in parallel according to one embodiment of the invention.

FIG. 2B illustrates one embodiment of the invention where all the panels are connected in parallel. The panels can be produced from different manufacturers and constructed using different technologies, e.g. crystalline silicon, thin film, amorphous silicon, etc. and specifications. Panels connected in parallel function independently of each other. As a result, the panels are installed in the best position and at the best angle for harvesting energy. The solar panels 200 are coupled to individual converter components 205. The energy is transferred to the inverter 230 via a DC power buss 225.

Figure 3:
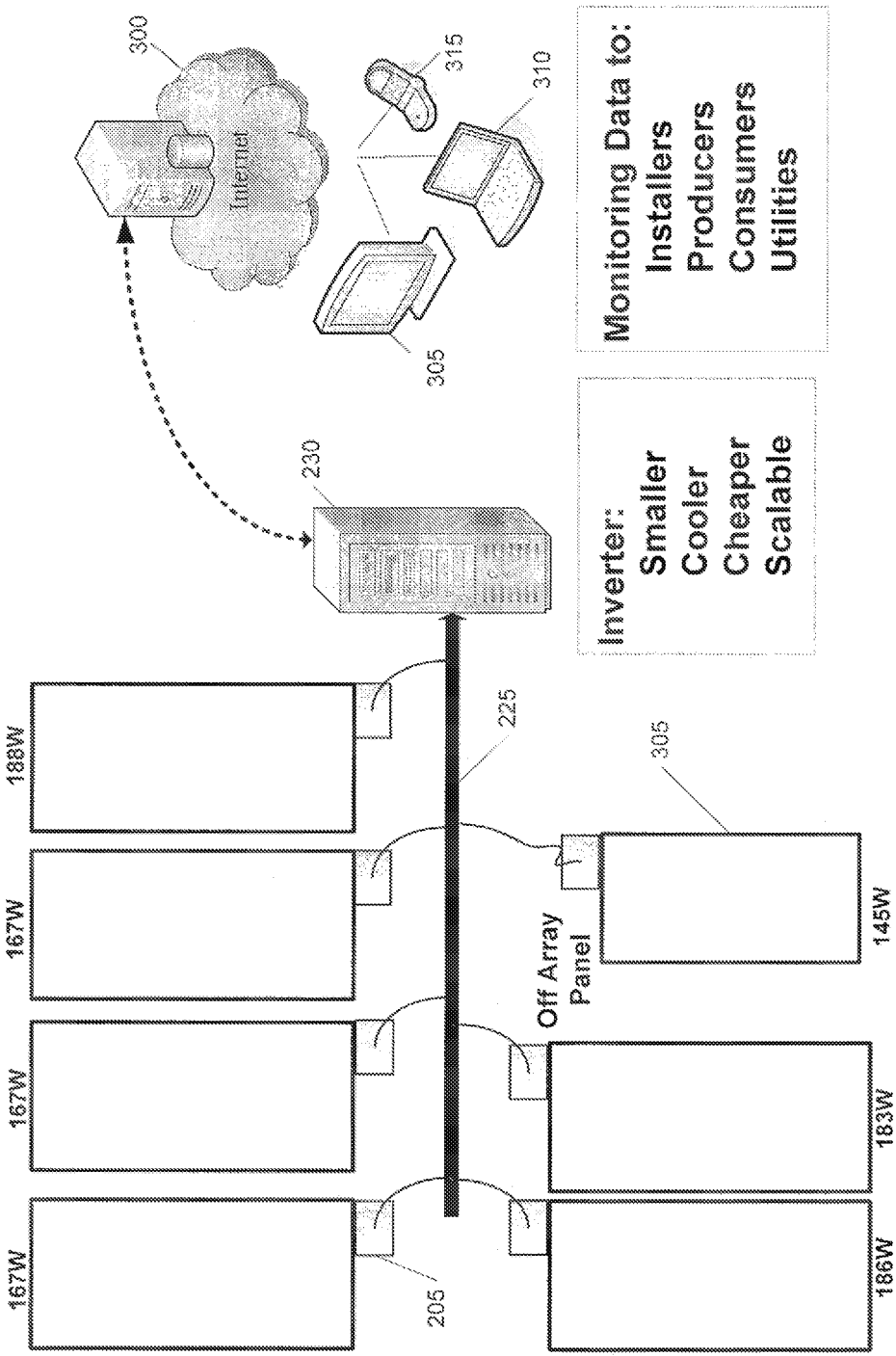
FIG. 3 is an illustration of a solar panel system including panel modules, an inverter, and a monitoring system according to one embodiment of the invention.

FIG. 3 is an illustration of the system that includes transmission of the data obtained by the communications component 220 from the inverter 230 to users via the Internet 300. The monitoring data is sent to installers, producers, consumers, utility companies, etc. This data can be reviewed from anywhere, for example, on a desktop 305, a laptop 310, or even on a handheld device 315.

FIG. 3 also illustrates that the different panels produce different amounts of power. For example, some produce 167 watts, some produce 188 watts, etc. In addition, the panels are not all part of the same array. The off-array panel 305 is connected to the power buss 225 in the same manner as the other panels 200.

Circuit Block Diagram

Figure 4:
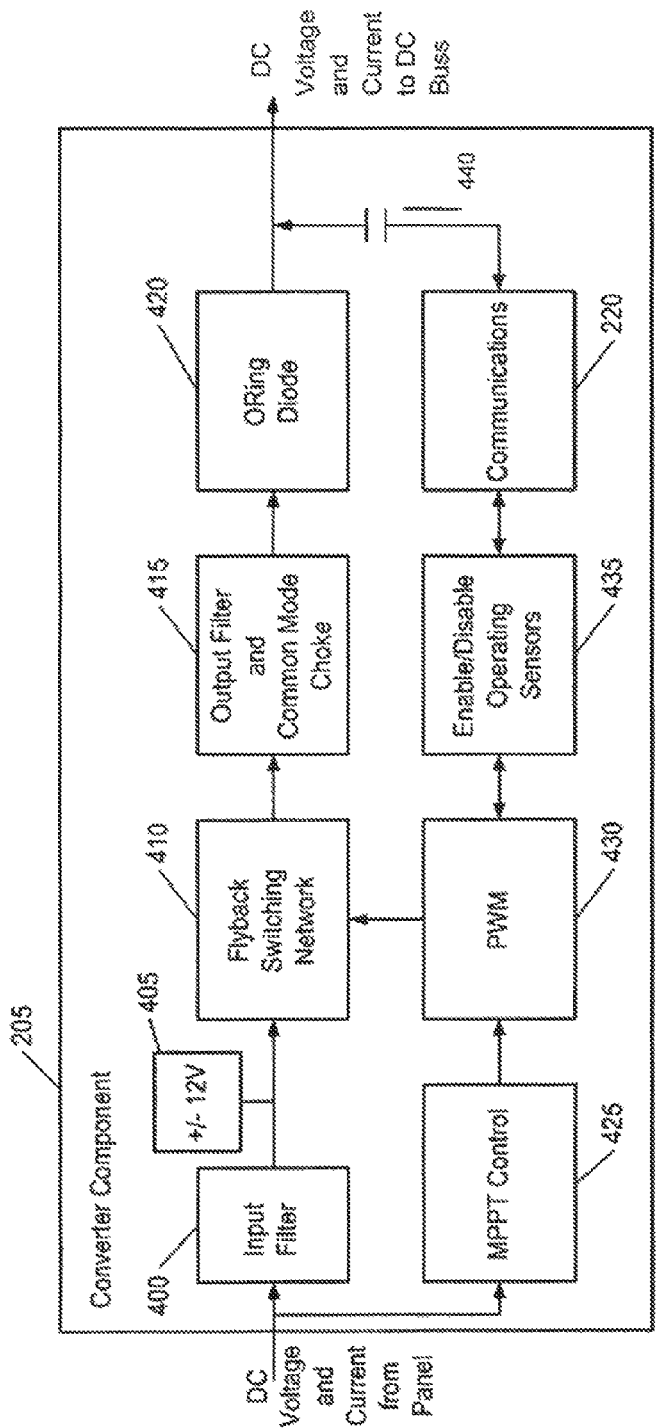
FIG. 4 is a more detailed illustration of the solar panel system according to one embodiment of the invention.

The circuit block diagram for the system is illustrated in FIG. 4 according to one embodiment of the invention. The DC DC boost converter 210 comprises an input filter 400, an auxiliary power supply 405, a flyback switching network 410, an output filter and common mode choke 415, an ORing diode 420, and enable/disable operating sensors 435. The converter component 205 receives a variable DC input voltage and current and converts it to an output power at a voltage level determined by the DC buss 225 as set by the inverter 230. The input filter 400 performs electromagnetic interference filtering from the flyback switching network 410 back to the panel 200. The auxiliary power supply 405 provides internal power for the various circuits within the converter component 205.

The output filter and common mode choke component 415 provides electromagnetic interference filtering out to the DC buss 225 and also prevents the communication signal from being absorbed by the filter components. The output is then connected to the DC buss via an ORing diode 420, which prevents power backfeed from the DC buss 225 to the converter component 205.

The MPPT component 215 comprises an MPPT control 425 and a pulse width modulator (PWM) 430. The MPPT control 425 determines the panel 200 output impedance and matches the input impedance of the flyback switching network 410 via the PWM 430 for maximum power transfer. The MPPT control 425 includes an autoranging feature that allows panels of differing output voltages and currents to be used on the same buss 225. The output of the panel 200 is sensed and the appropriate operating range is selected. In one embodiment, the flyback switching network 410 boosts the input voltage until power begins flowing onto the DC buss 225. Output power to input power efficiencies of greater than 95% have been realized using this topology.

The enable/disable operating sensors component 435 performs circuit function tests such as temperature, voltage and current to ensure operation within the converter component's 205 safe operating specifications. Power up sequencing includes checking for an enable signal from the inverter 230, via the DC buss 225 and the communications component 220 before enabling the PWM 430 and the flyback switching network 410. When disabled, the converter component 205 is in the off state and has zero output voltage and current. The enable/disable component 435 also internally limits the output voltage to prevent runaway and destruction of the circuit. In one embodiment, this voltage limit is set at 375V. If the enable signal from the inverter 230 is lost, the PWM 430 and flyback switching network 410 are immediately disabled and the excess voltage and current are bled off in a controlled manner.

In one embodiment, the communications component 220, i.e. the physical layer is capacitively coupled 440 to the DC buss 225 via a radio frequency (RF) carrier for power line communication to the inverter 230. Other physical layer embodiments include inductive coupling to the DC Buss 212 as well as wireless communications between the converter component 205 and the inverter 230. In one embodiment the communications protocol is implemented using a controller area network (CAN) bus. A person of ordinary skill in the art will recognize which embodiment is appropriate for each system architecture.

Regardless of the input voltage and current, in this embodiment the output is always the same so that multiple converter components 205 can be connected in parallel to sum the power of each panel. The power control loop is unregulated so that the DC buss 225 determines the output voltage of the converter components 205. In this manner, all paralleled converter components 205 regulate to the buss voltage, which is set by the inverter 230 according to its operating requirements.

By connecting panels 200 in parallel and performing per panel maximum power point operation, each panel operates as an independent power producer from any other panel within the system. In this way, power loss due to temperature effects, shading, panel fault or disconnect, is limited to the affected panel and the power loss is minimized. Conversely, in conventional string topologies the panels are connected in a series string and the system performance is determined by the least performing panel. In traditional topologies a single panel fault or disconnect brings down the entire string.

Figure 5:
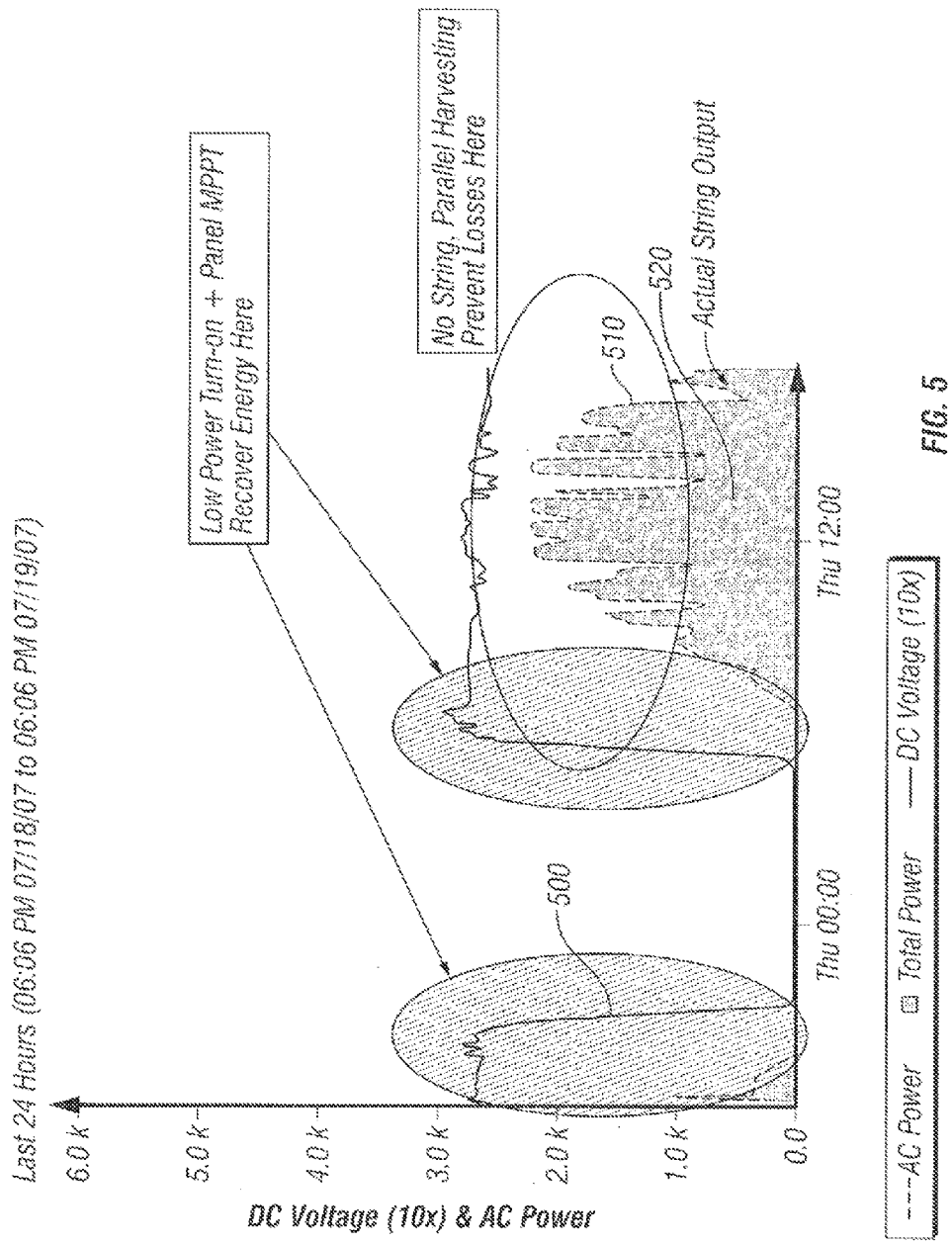
FIG. 5 is an example of the power obtained from solar panels as a function of time according to one embodiment of the invention.

FIG. 5 is a plot of voltage as a function of time. The DC voltage 500 and the AC voltage 510 were plotted over a 24 hour period. The area under the AC curve represents the total power 520. This graph demonstrates that as a result of the MPPT control 425, energy can be recovered during the initial start-up phase and when panels experience shading, because the panels are connected in parallel instead of the conventional series string topology.

There are many advantages associated with per panel voltage boost. First, panels of any size and operating characteristic can be incorporated into a single system since the output of each panel is now normalized via the converter component 205. Second, panels can be placed in virtually any location or configuration, which significantly reduces system design and installation time and costs. Lastly, additional panels can be added to an existing system without requiring complete system redesign and reinstallation. In one embodiment solar panels are integrated with other power sources, e.g. fuel cell, wind turbines, batteries, etc. onto a single DC buss 225. Each power source has its own converter componenet 205, which results in maximum system integration for either grid tie or off-grid applications.

DC AC Inverter System

The inverter 215 converts the electrical DC, i.e. voltage and current output from a DC energy source, e.g. solar panels, fuel cells, batteries, or wind turbines, to an AC i.e. voltage and current output and transfers the AC to a utility power grid 235 or battery 235. When DC sources are used to supplement grid power, the grid tie inverter performs the DC to AC conversion and regulatory synchronization to the utility power grid. Surplus power generated by the system is sold back to the utility company depending on the system's location. For off-grid applications, energy harvested from solar panels and other renewable energy sources is used to supply power and is stored in systems, e.g. batteries for use when the energy sources are unavailable.

In one embodiment, the inverter 230 is a less complex and smaller inverter than traditional models because the DC buss 225 voltage is boosted by the converter component 205 to an optimized level and therefore does not need an input DC voltage level converter or level shifting transformer at the inverter's output. The smaller inverter is less expensive, creates a more reliable system, and significantly improves power harvesting.

The inverter 230 consists of an optimized modulator, power factor correction, anti-islanding, and grid synchronizing circuitry. It also contains a communication component 240 that provides data transfer between the inverter 230 and the converter component 205 coupled to the panel 200. The inverter 230 may also contain a secondary communications component that sends the system data to web based services for distribution to applicable stakeholders, e.g. the system owner, installer, financer, etc.

The communications layer can be used to gather operational data from the system, as well as control the operation of each converter component 205. For example, in one embodiment, the inverter 230 sends a power good signal to the converter module 205 to confirm that the system is properly connected and operating within normal parameters. The power good signal is typically sent shortly after the system is powered on. If the power good signal is not received by the communication component 205, the boost converter 210 is disabled to prevent damage to the various components and to provide a safe environment for maintenance or emergency conditions where the system must be turned off.

Operational data can be formatted to comply with user or utility report requirements. Remote control of the system is possible in order to disable the entire system in the event of an emergency requiring all systems off and safe. Thus, in one embodiment, the communications component 240 receives input from a user. The communications component 240 can also be used to monitor and control other appliances and systems within the local circuit network.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A system for harvesting maximum power from a plurality of energy sources comprising:
    a DC buss for transmitting DC to a load, wherein said DC buss operates at a DC buss voltage set by said load;
    a plurality of energy receiving components each configured for outputting direct current (DC) from energy received from at least one energy source independently from each other, wherein each energy receiving component from among said plurality of energy receiving components further comprises a converter component comprising:
        a boost converter for upconverting said DC from said energy receiving component to said DC buss voltage;
    wherein each of said at least one converter component is connected to said DC buss in parallel with others of said at least one converter component; and
    wherein said boost converter in each respective converter component operates said converter component as an independent power producer by converting a variable DC voltage and current received from said energy receiving components to an output power at a voltage determined by the DC buss as set by the load.

2. The system of claim 1, further comprising:
    an inverter for inverting electrical energy from direct current (DC) to an alternating current (AC); and
    a power capturing source for receiving said AC from said inverter.

3. The system of claim 1, further comprising:
    a maximum power point tracking (MPPT) component for real time determination of an output impedance of said energy receiving component;
    said MPPT component varying an operating point of said boost converter to match said impedance of said DC from said energy receiving component to maximize transfer of power.

4. The system of claim 1, said converter component further comprising:
    an input filter for filtering electromagnetic interference and reducing voltage and current ripple backfeed from said DC to said energy receiving components;
    a switching network for upconverting a voltage of said DC from said energy receiving components to said DC buss voltage;
    an output filter for filtering electromagnetic interference and reducing said DC voltage and current ripple to said DC buss;
    an ORing component for preventing backfeed from said DC buss into said converter component; and
    a common mode choke for facilitating power line communications via radio frequency (RF) signals superimposed onto said DC buss.

5. The system of claim 2, said MPPT component further comprising:
    a MPPT control for generating a maximum power point for said DC; and
    a pulse width modulator for matching an input impedance of said converter component to an output impedance of said energy receiving source.

6. The system of claim 1, further comprising:
    a communication component for gathering information about said energy receiving components, said communication component transmitting a signal over a power line by generating radio frequency signals that represent digital signals.

7. The system of claim 4, wherein said information gathered by said communication component comprises at least one of:
    temperature, voltage, power, current, efficiency, and diagnostics of said energy receiving components.

8. The system of claim 6, wherein said communication component receives inputs.

9. The system of claim 8, said communication component comprising:
    means for transmitting instructions to said converter component to deactivate said converter component's output in response to any of user input, loss of an enable signal from an inverter, disconnection from said DC buss, and disconnection of said inverter from said DC buss.

10. The system of claim 1, wherein said energy receiving components comprise solar panels.

11. The system of claim 1, wherein said energy receiving components receive energy from at least one of solar power, wind energy, hydroelectric energy, a fuel cell, and a battery.

12. The system of claim 1, said inverter further comprising:
    a communications component that transmits information about said system using a wireless transmission.

13. A method for harvesting energy, the method comprising the steps of:
    transmitting, with a DC buss, to a load, wherein each of said DC buss operates at a DC buss voltage set by said load;
    capturing energy with a plurality of energy receiving components, wherein said captured energy is output as a direct current (DC), and wherein each energy receiving component captures energy independently from one another by configuring each energy receiving component with a converter component comprising a boost converter for upconverting said DC from said energy receiving component to said DC buss voltage; and
    upconverting, by said boost converter, said DC from each said energy receiving component;
    wherein said boost converter is connected to said DC buss in parallel to others of said at least one boost converter;
    wherein said boost converter in each respective converter component operates said converter component as an independent power producer by converting a variable DC voltage and current received from energy receiving component to an output power at a voltage determined by the DC buss as set by the load.

14. The method of claim 13, further comprising:
    inverting, with an inverter, electrical energy from direct current (DC) to an alternating current (AC), wherein said inverter is configured with a threshold voltage; and
    said inverter transmitting said AC to a power capturing source.

15. The method of claim 13, further comprising:
  determining, by a maximum power point tracking (MPPT) component within each of said at least one boost converter, an output impedance of at least one energy receiving component by varying an operation point of said boost converter to match said impedance of said DC from said energy receiving component.

16. The method of claim 15, further comprising the steps of:
  generating a maximum power point for voltage of said DC with an MPPT control; and
  matching an input impedance of said converter component to an output impedance of said energy receiving component with a pulse width modulator.

17. The method of claim 13, further comprising the steps of:
  filtering electromagnetic interference and reducing voltage and current ripple backfeed from said DC to said energy receiving components an input filter;
  upconverting said DC voltage from said energy receiving components to said DC buss voltage with a switching network;
  filtering electromagnetic interference and reducing voltage of said DC and current ripple to said DC buss with an output filter;
  preventing backfeed from said DC buss into said converter component with an ORing component; and
  facilitating power line communications via radio frequency (RF) signals superimposed onto said DC buss with a common mode choke.

18. The method of claim 13, further comprising the step of:
  gathering information about said energy receiving components with a communications component, said communication component transmitting a signal over a power line by generating radio frequency signals that represent digital signals.

19. The method of claim 18, wherein said information gathered by said communication component comprises at least one of temperature, voltage, power, current, efficiency, and diagnostics of said energy receiving components.

20. The method of claim 18, further comprising the step of:
  said communication component receiving inputs from a user.

21. The method of claim 20, further comprising the step of:
  transmitting instructions to said converter component with said communication component to deactivate said converter component's output in response to any of user input, loss of an enable signal from an inverter, disconnection from said DC buss, and disconnection of said inverter from said DC buss.

22. The method of claim 13, wherein said energy receiving components comprise solar panels.

23. The method of claim 13, further comprising the step of:
  receiving energy from at least one of solar power, wind energy, hydroelectric energy, a fuel cell, and a battery with said energy receiving components.

24. The method of claim 13, further comprising the step of:
  transmitting information about said system through wireless transmission with said communications component.

\* \* \* \* \*